US009321969B1

(12) United States Patent
Newstadt et al.

(10) Patent No.: US 9,321,969 B1
(45) Date of Patent: Apr. 26, 2016

(54) SYSTEMS AND METHODS FOR ENABLING USERS OF SOCIAL-NETWORKING APPLICATIONS TO INTERACT USING VIRTUAL PERSONAS

(71) Applicants: Keith Newstadt, West Newton, MA (US); Douglas Gibson, Newton, MA (US)

(72) Inventors: Keith Newstadt, West Newton, MA (US); Douglas Gibson, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 243 days.

(21) Appl. No.: 13/645,258

(22) Filed: Oct. 4, 2012

(51) Int. Cl.
*G06N 3/00* (2006.01)
*C10G 1/08* (2006.01)

(52) U.S. Cl.
CPC . *C10G 1/086* (2013.01); *C10G 1/08* (2013.01)

(58) Field of Classification Search
None
See application file for complete search history.

(56) References Cited

U.S. PATENT DOCUMENTS

| 2005/0108329 | A1* | 5/2005 | Weaver et al. | 709/204 |
| 2007/0061730 | A1* | 3/2007 | O'Mahony et al. | 715/733 |
| 2008/0201638 | A1* | 8/2008 | Nair | 715/706 |
| 2009/0037544 | A1* | 2/2009 | Wang et al. | 709/206 |
| 2009/0215476 | A1* | 8/2009 | Tysowski | 455/466 |
| 2009/0254563 | A1* | 10/2009 | Arnold et al. | 707/10 |
| 2010/0146052 | A1* | 6/2010 | Pare et al. | 709/204 |
| 2010/0162149 | A1* | 6/2010 | Sheleheda et al. | 715/764 |

OTHER PUBLICATIONS

Yahoo Help; What are identities (aliases) and profiles?; http://help.yahoo.com/l/ca/yahoo/pager/use/use-13.html; Taken from site on Aug. 21, 2012.
"List of social networking websites", http://en.wikipedia.org/wiki/List_of_social_networking_websites, as accessed Apr. 16, 2012, Wikipedia, (Jul. 6, 2006).
"Facebook", https://www.facebook.com/, as accessed Apr. 16, 2012, (on or before Apr. 16, 2012).

* cited by examiner

*Primary Examiner* — Chris Parry
*Assistant Examiner* — Stephen Houlihan
(74) *Attorney, Agent, or Firm* — ALG Intellectual Property, LLC

(57) ABSTRACT

A computer-implemented method for enabling users of social-networking applications to interact using virtual personas may include (1) creating a social-networking identity associated with a user of a social-networking application, (2) creating a plurality of virtual personas that represent different real-life roles of the user as part of the user's social-networking identity, (3) receiving a request to perform at least one networking action that implicates at least one of the user's virtual personas, and then (4) directing the social-networking application to perform the networking action such that the networking action implicates the user's virtual persona without implicating the user's entire social-networking identity. Various other methods, systems, and computer-readable media are also disclosed.

19 Claims, 7 Drawing Sheets

SYSTEMS AND METHODS FOR ENABLING USERS OF SOCIAL-NETWORKING APPLICATIONS TO INTERACT USING VIRTUAL PERSONAS

BACKGROUND

In recent years, the popularity of social-networking applications (such as FACEBOOK, TWITTER, and LINKEDIN) has increased dramatically among technology users. Some social-networking applications allow users to create profiles that enable the users to stay in touch with one another and/or meet new people. For example, a user of a social-networking application may establish connections with various other users (including, e.g., the user's friends, relatives, colleagues, and/or acquaintances—as well as complete strangers) by linking his or her profile to the other users' profiles. In this example, upon establishing such connections, the user may share various types of content (such as personal information, geo-location information, photographs, and/or status updates) with the other users.

Unfortunately, while conventional social-networking applications may enable users to share various types of content with one another, such social-networking applications may still fail to enable users to tailor their online behavior to different groups of people in the same way that people may do so in the real world. For example, a conventional social-networking application may fail to enable a user to share his or her resume with a group of business professionals while concealing the same from a group of romantic suitors. Similarly, the conventional social-networking application may fail to enable the user to highlight certain personal attributes to romantic suitors while concealing the same from business professionals.

As such, the instant disclosure identifies a need for systems and methods for enabling users of social-networking applications to tailor their online behavior to other users based on their relationships with one another in the real world.

SUMMARY

As will be described in greater detail below, the instant disclosure generally relates to systems and methods for enabling users of social-networking applications to interact using virtual personas in order to maintain control over their social-networking identities. In one example, a computer-implemented method for accomplishing such a task may include (1) creating a social-networking identity associated with a user of a social-networking application, (2) creating a plurality of virtual personas that represent different real-life roles of the user as part of the user's social-networking identity, (3) receiving a request to perform at least one networking action that implicates at least one of the user's virtual personas, and then (4) directing the social-networking application to perform the networking action such that the networking action implicates the user's virtual persona without implicating the user's entire social-networking identity.

Examples of the networking action include, without limitation, establishing a social-networking relationship between the user's virtual persona and at least one other user of the social-networking application, transmitting a message that includes a link to at least one content instance associated with the user's virtual persona to at least one other user of the social-networking application, transmitting a message that includes at least one content instance associated with the user's virtual persona to at least one other user of the social-networking application, sharing at least one content instance associated with the user's virtual persona with at least one other user of the social-networking application, associating at least one content instance previously shared via the social-networking application with the user's virtual persona, and/or any other suitable networking action.

In some examples, the method may also include defining at least one of the user's virtual personas by identifying a set of content instances associated with the user's social-networking identity and then associating at least one of the content instances with the user's virtual persona. Examples of the user's virtual personas include, without limitation, virtual personas that represent the user's role as an employee, the user's role as a professional, the user's role as a colleague, the user's role as a relative, the user's role as a parent, the user's role as a child, the user's role as a friend, the user's role as an acquaintance, the user's role as a church member, the user's role as a student, the user's role as a job seeker, the user's role as a romantic-relationship seeker, the user's role as an online social-group moderator, and/or any other suitable role of the user.

In some examples, the method may also include providing the other user with access to at least one content instance associated with the user's virtual persona. In such examples, the method may further include denying the other user access to at least one other content instance associated with the user's social-networking identity but not associated with the user's virtual persona.

In some examples, the method may also include receiving the request to perform the networking action from the user of the social-networking application. In such examples, the method may further include receiving a request from the user to establish a social-networking relationship between the user's virtual persona and the other user of the social-networking application. In addition, the method may include analyzing the user's request to perform the networking action and then determining that the user has selected the virtual persona to be associated with the networking action based on the analysis of the user's request.

Additionally or alternatively, the method may include receiving the request to perform the networking action from at least one other user of the social-networking application. In some examples, the method may also include receiving a request from the other user to establish a social-networking relationship between the user's social-networking identity and the other user. In such examples, the method may further include transmitting a request to obtain the user's consent to establish the social-networking relationship between the user's social-networking identity and the other user. In addition, the method may include obtaining the user's consent to establish a social-networking relationship between the user's virtual persona and the other user without establishing the social-networking relationship between the user's entire social-networking identity and the other user.

In some examples, the method may also include determining that the networking action implicates at least one other user of the social-networking application. In such examples, the method may further include obtaining the other user's consent to perform the networking action in response to determining that the networking action implicates the other user. In addition, the method may include directing the social-networking application to perform the networking action in response to obtaining the other user's consent.

In some examples, the method may also include directing the social-networking application to perform the networking action such that the networking action implicates the user's virtual persona without implicating any other virtual persona associated with the user's social-networking identity. In some examples, the method may be performed by a plug-in that interfaces with the social-networking application.

In some examples, the method may also include defining at least one geo-location associated with the user's virtual persona. In such examples, the method may further include enabling the user to share, under the user's virtual persona, at least one content instance that identifies the user's location while the user is located at the geo-location. In addition, the method may include preventing the user from sharing the content instance that identifies the user's location under any other virtual persona associated with the user's social-networking identity.

In one embodiment, a system for implementing the above-described method may include (1) a creator module programmed to (a) create a social-networking identity associated with a user of a social-networking application and (b) create a plurality of virtual personas that represent different real-life roles of the user as part of the user's social-networking identity, (2) a receiver module programmed to receive a request to perform at least one networking action that implicates at least one of the user's virtual personas, and (3) a director module programmed to direct the social-networking application to perform the networking action such that the networking action implicates the user's virtual persona without implicating the user's entire social-networking identity.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) create a social-networking identity associated with a user of a social-networking application, (2) create a plurality of virtual personas that represent different real-life roles of the user as part of the user's social-networking identity, (3) receive a request to perform at least one networking action that implicates at least one of the user's virtual personas, and then (4) direct the social-networking application to perform the networking action such that the networking action implicates the user's virtual persona without implicating the user's entire social-networking identity.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
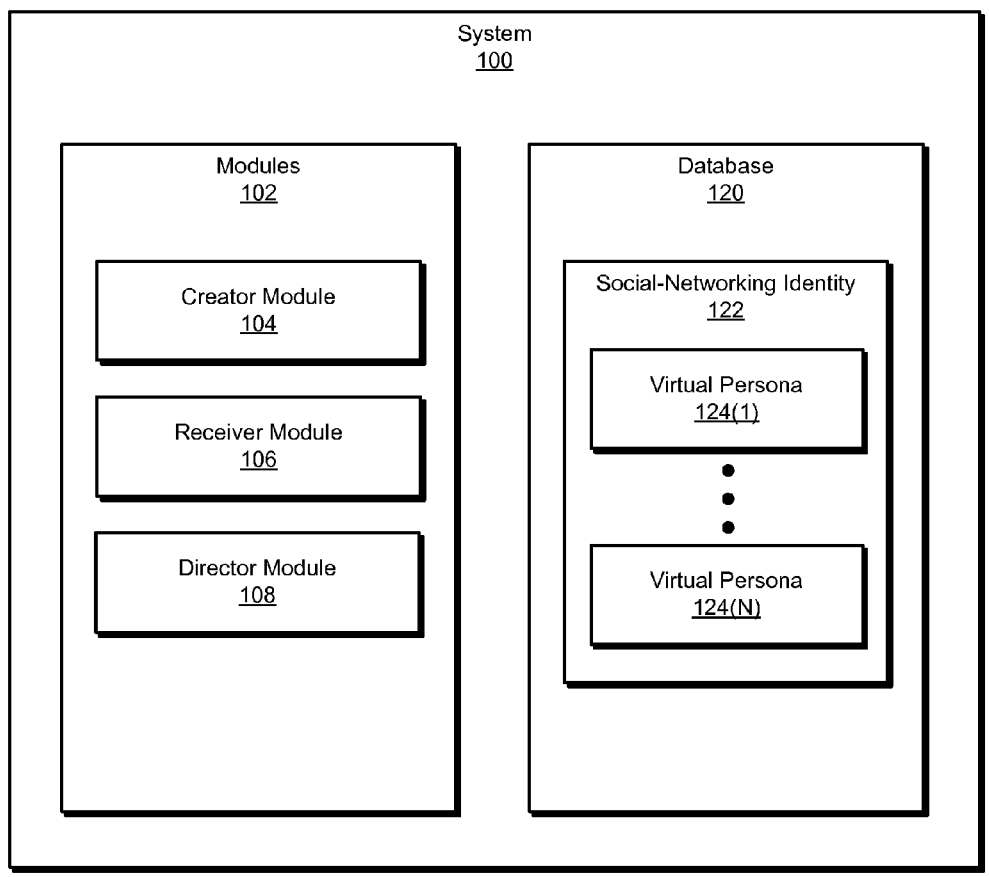
FIG. 1 is a block diagram of an exemplary system for enabling users of social-networking applications to interact using virtual personas.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for enabling users of social-networking applications to interact using virtual personas. As will be explained in greater detail below, by enabling users of social-networking applications to interact with one another using virtual personas, the various systems and methods described herein may provide the users with the ability to tailor their online behavior to other users based on their relationships with one another in the real world. In addition, by providing users of social-networking applications with the ability to tailor their online behavior to other users based on their relationships with one another in the real world, the various systems and methods described herein may enable the users to maintain increased control over their social-networking identities (such as their online identities) and/or improve their online experience.

Figure 2:
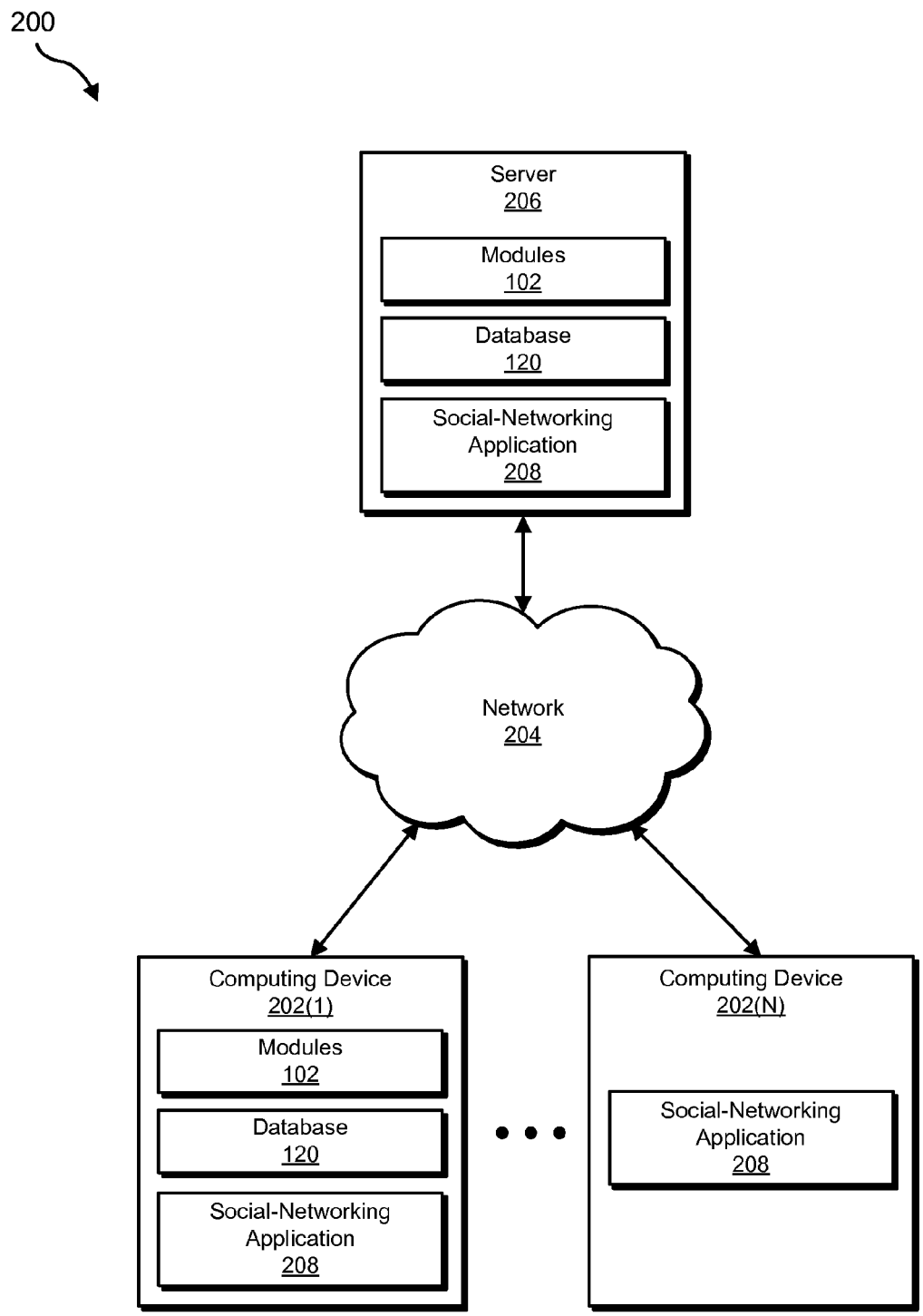
FIG. 2 is a block diagram of an exemplary system for enabling users of social-networking applications to interact using virtual personas.

The following will provide, with reference to FIGS. 1-2, detailed descriptions of exemplary systems for enabling users of social-networking applications to interact using virtual personas. Detailed descriptions of corresponding computer-implemented methods will be provided in connection with FIG. 3. Detailed descriptions of an exemplary social-networking identity associated with a user of a social-networking application, an exemplary request to perform a networking action will be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for enabling users of social-networking applications to interact using virtual personas. As illustrated in this figure, exemplary system 100 may include one or more modules 102 for performing one or more tasks. For example, and as will be explained in greater detail below, exemplary system 100 may include a creator module 104 programmed to (1) create a social-networking identity associated with a user of a social-networking application and (2) create a plurality of virtual personas that represent different real-life roles of the user as part of the user's social-networking identity. Exemplary system 100 may also include a receiver module 106 programmed to receive a request to perform at least one networking action that implicates at least one of the user's virtual personas.

In addition, and as will be described in greater detail below, exemplary system 100 may include a director module 108 programmed to direct the social-networking application to perform the networking action such that the networking action implicates the user's virtual persona without implicating the user's entire social-networking identity. Although illustrated as separate elements, one or more of modules 102 in FIG. 1 may represent portions of a single module or application (such as a social-networking application or a plug-in that interfaces with a social-networking application).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store any type or form of data and/or information associated with a social-networking identity 122. For example, database 120 may be configured to store data and/or information associated with virtual personas 124(1)-124(N) that represent different real-life roles of a user associated with social-networking identity 122. In addition, although not illustrated in FIG. 1, database 120 may be configured to store any additional data and/or information used to enable users of social-networking applications to interact with one another using virtual personas.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a server 206 via a network 204. Computing devices 202(1)-(N) may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor associated with at least one of computing devices 202(1)-(N) and/or server 206, facilitate at least one of computing devices 202(1)-(N) and/or server 206 in enabling users of social-networking applications to interact using virtual personas. For example, and as will be described in greater detail below, one or more of modules 102 may cause at least one of computing devices 202(1)-(N) and/or server 206 to (1) create a social-networking identity associated with a user of a social-networking application, (2) create a plurality of virtual personas that represent different real-life roles of the user as part of the user's social-networking identity, (3) receive a request to perform at least one networking action that implicates at least one of the user's virtual personas, and then (4) direct the social-networking application to perform the networking action such that the networking action implicates the user's virtual persona without implicating the user's entire social-networking identity.

Computing devices 202(1)-(N) generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device capable of providing and/or facilitating a social-networking application used in connection with one or more additional computing devices (such as computing devices 202(1)-(N)). Examples of server 206 and 306 include, without limitation, application servers, web servers, and database servers configured to run certain software applications and/or provide various web and/or database services.

Social-networking application 208 generally represents any type or form of software application capable of facilitating a social network consisting of users of computing devices (such as computing devices 202(1)-(N)). For example, social-networking application 208 may represent a distributed software application collectively implemented by computing devices (such as computing devices 202(1)-(N) and/or server 206). Additionally or alternatively, social-networking application 208 may represent a stand-alone software application capable of interfacing with other instances of the social-networking application via a network (such as network 204). Examples of social-networking application 208 include, without limitation, FACEBOOK, TWITTER, LINKEDIN, BUMP, MYSPACE, GOOGLE+, TAGGED, MATCH.COM, EHARMONY.COM, MYYEARBOOK, MEETUP, MYLIFE, MYHERITAGE, MULTIPLY, ORKUT, NING, CLASSMATES.COM, BEBO, FRIENDSTER, HI5, ORKUT, PERFSPOT, ZORPIA, NETLOG, HABBO, or any other application that facilitates social networking.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), a Bluetooth network or communication, a Near Field Communication (NFC) network or communication (as facilitated by, e.g., GOOGLE's ANDROID BEAM technology), exemplary network architecture 700 in FIG. 7, or the like. Network 204 may facilitate communication or data transfer using wireless or wired connections. In one embodiment, network 204 may facilitate communication between computing devices 202(1)-(N) and/or server 206.

Figure 3:
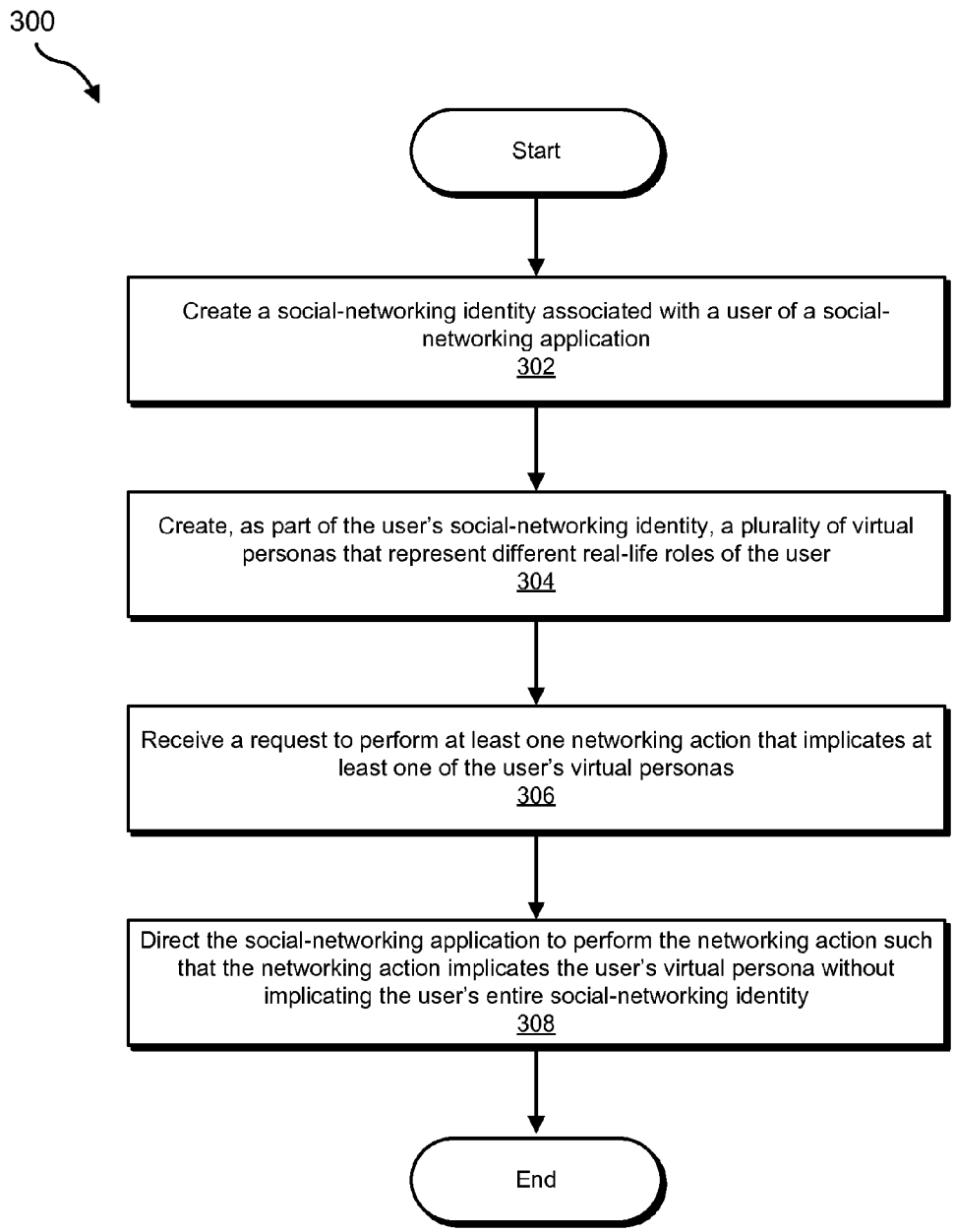
FIG. 3 is a flow diagram of an exemplary method for enabling users of social-networking applications to interact using virtual personas.

FIG. 3 is a flow diagram of an exemplary computer-implemented method 300 for enabling users of social-networking applications to interact using virtual personas. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 the various systems described herein may create a social-networking identity associated with a user of a social-networking application. For example, creator module 104 may, as part of server 206 (or, alternatively, as part of computing device 202(1)), create social-networking identity 122 associated with a user of social-networking application 208. The phrase "social-networking identity," as used herein, generally refers to any type or form of profile, user account, and/or user-specific webpage associated with a user of a social-networking application.

The systems described herein may perform step 302 in a variety of ways. In some examples, creator module 104 may collect information from the user of computing device 202(1) in order to create social-networking identity 122 based at least in part on the user's information. For example, creator module 104 may direct computing device 202(1) to display a user interface configured to collect information from the user as part of a registration of sign-up process associated with social-networking application 208. In one example, creator module 104 may direct computing device 202(1) to access a web-based user interface hosted by server 206 and then display the user interface to the user. In another example, creator module 104 may direct computing device 202(1) to access a client-based user interface stored locally on computing device 202(1) and then display the user interface to the user.

In some examples, after computing device 202(1) has displayed the user interface, the user may enter various types of information into the user interface as part of the registration or sign-up process associated with social-networking application 208. In such examples, creator module 104 may collect the information entered by the user and then create social-networking identity 122 based at least in part on the information collected from the user.

Additionally or alternatively, creator module 104 may import at least a portion of the user's information from one or more computer-based resources (such as one or more websites or additional social-networking applications). For example, creator module 104 may obtain the user's consent to access the user's profile associated with another social-networking application. In this example, upon obtaining the user's consent, creator module 104 may access the user's profile associated with the other social-networking application and then import (by, e.g., copying) at least a portion of the user's information from the user's profile into social-networking identity 122.

In some examples, after creating social-networking identity 122, creator module 104 may modify social-networking identity 122 upon receiving a request from the user. For example, the user may submit a request to update social-networking identity 122 to include additional information omitted by the user during the initial registration or sign-up process. In this example, creator module 104 may receive the request from the user and then update social-networking identity 122 in response to the user's request.

Examples of the user's information used to create, modify, and/or represent social-networking identity 122 include, without limitation, information that identifies one or more of the user's names, the user's nicknames, the user's current or former physical addresses, the user's phone numbers, the user's email addresses, the user's current or former educational institutions, the user's pending or obtained educational degrees, the user's current or former employers, the user's current or former occupations, the user's computing devices, the user's religions, the user's relationship statuses, the user's political views, the user's interests, the user's hobbies, the user's organizations, the user's business connections, the user's favorite musical genres, the user's favorite musical artists, the user's favorite books, the user's favorite movies, the user's favorite television shows, the user's favorite games, the user's favorite athletes, and/or any other suitable information associated with the user.

As illustrated in FIG. 3, at step 304 the various systems described herein may create a plurality of virtual personas that represent different real-life roles of the user. For example, creator module 104 may, as part of server 206 (or, alternatively, as part of computing device 202(1)), create virtual personas 124(1)-(N) that represent different real-life roles of the user of social-networking application 208. In this example, creator module 104 may create virtual personas 124(1)-(N) as part of social-networking identity 122.

Examples of virtual personas 124(1)-(N) include, without limitation, virtual personas that represent the user's role as an employee, the user's role as a professional, the user's role as a colleague, the user's role as a relative, the user's role as a parent, the user's role as a child, the user's role as a friend, the user's role as an acquaintance, the user's role as a church member, the user's role as a student, the user's role as a job seeker, the user's role as a romantic-relationship seeker, the user's role as an online social-group moderator, and/or any other suitable role of the user.

The systems described herein may perform step 304 in a variety of ways. In some examples, creator module 104 may define one or more of virtual personas 124(1)-(N) based at least in part on the user's instructions. For example, creator module 104 may receive a request from the user to create virtual persona 124(1) to represent the user's real-life role as an employee. In another example, creator module 104 may receive a request from the user to create virtual persona 124(N) to represent the user's real-life role as an acquaintance.

Figure 4:
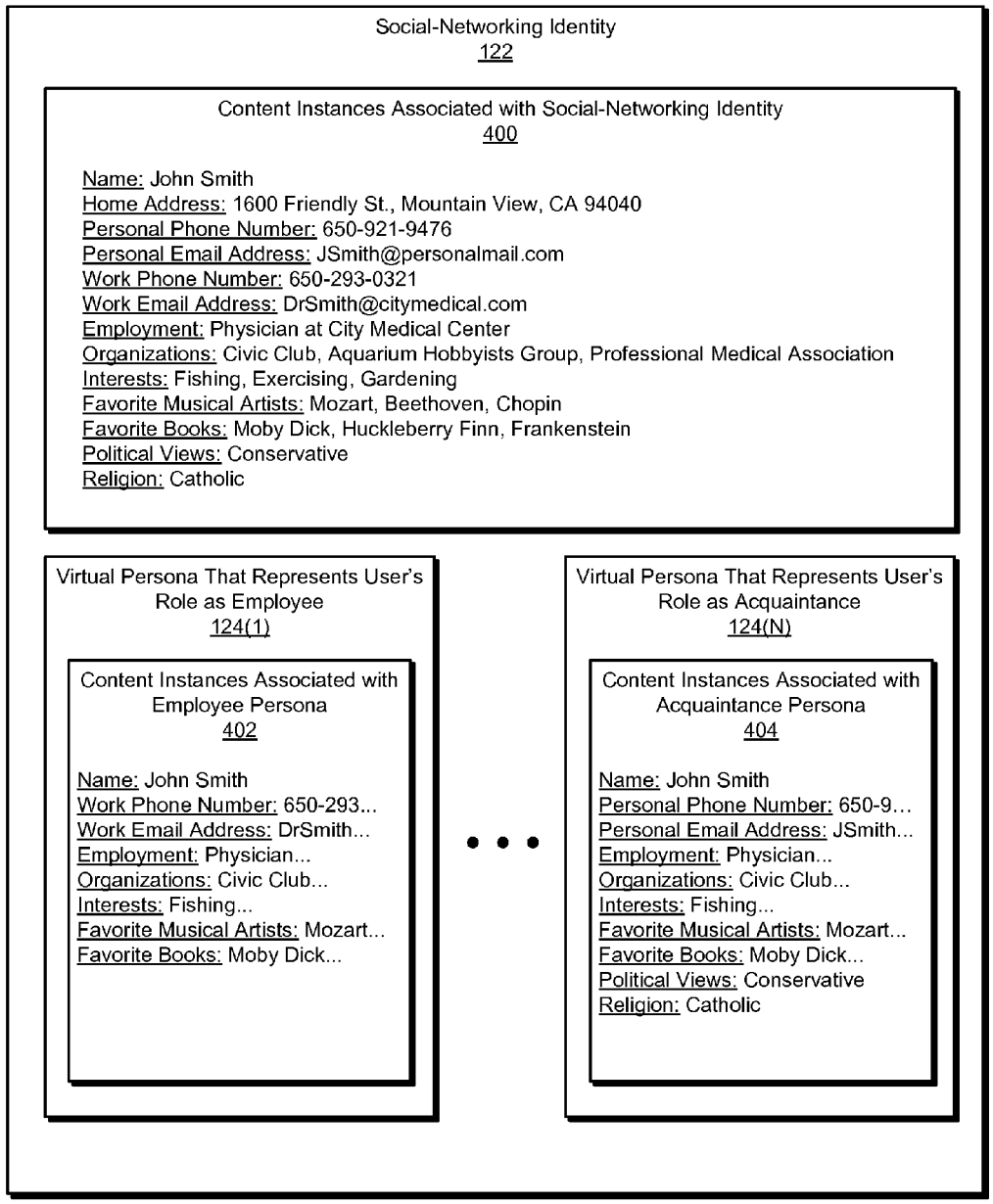
FIG. 4 is an illustration of an exemplary social-networking identity associated with a user of a social-networking application.

In some examples, in response to the user's request, creator module 104 may direct computing device 202(1) to display a set of content instances associated with social-networking identity 122 to the user. For example, creator module 104 may direct computing device 202(1) to display content instances 400 in FIG. 4 to the user. As illustrated in FIG. 4, content instances 400 may identify the user's name (in this example, "John Smith"), the user's home address (in this example, "1600 Friendly St., Mountain View, Calif. 94040"), the user's personal phone number (in this example, "650-921-9476"), the user's personal email address (in this example, "JSmith@personalmail.com"), the user's work phone number (in this example, "650-293-0321"), the user's work email address (in this example, "DrSmith@citymedical.com"), the user's current employment (in this example, "Physician at City Medical Center"), organizations to which the user belongs (in this example, "Civic Club, Aquarium Hobbyists Group, Professional Medical Association"), the user's interests (in this example, "Fishing, Exercising, Gardening"), the user's favorite musical artists (in this example, "Mozart, Beethoven, Chopin"), the user's favorite books (in this example, "Moby Dick, Huckleberry Finn, Frankenstein"), the user's political views (in this example, "Conservative"), and the user's religion (in this example, "Catholic").

Although not illustrated in content instances 400 in FIG. 4, additional examples of content instances associated with social-networking identity 122 include, without limitation, any of the user's information used to create, modify, and/or represent social-networking identity 122 (e.g., the user's information described above in connection with step 302), any images (e.g., photographic and/or video images) associated with social-networking identity 122, any content posted or otherwise shared under social-networking identity 122 via social-networking application 208, and/or any other suitable content instances associated with the user's social-networking identity.

In some examples, after computing device 202 has displayed the set of content instances associated with social-networking identity 122, the user may select one or more content instances from content instances 400 to be associated with one or more of virtual personas 124(1)-(N). For example, the user may select content instances 402 in FIG. 4 to be associated with virtual persona 124(1) representing the user's role as an employee. As illustrated in FIG. 4, content instances 402 may identify the user's name (in this example, "John Smith"), the user's work phone number (in this abbreviated example, "650-293 . . . "), the user's work email address (in this abbreviated example, "DrSmith . . . "), the user's employment (in this abbreviated example, "Physician . . . "), the user's organizations (in this abbreviated example, "Civic Club . . . "), the user's interests (in this abbreviated example, "Fishing . . . "), the user's favorite musical artists (in this abbreviated example, "Mozart . . . "), and the user's favorite books (in this abbreviated example, "Moby Dick . . . "). In this example, creator module 104 may receive the user's selection of content instances 402 and then associate the same with the virtual persona 124(1).

In another example, the user may select content instances 404 in FIG. 4 to be associated with virtual persona 124(N) representing the user's role as an acquaintance. As illustrated in FIG. 4, content instances 404 may identify the user's name (in this example, "John Smith"), the user's personal phone number (in this abbreviated example, "650-9 . . . "), the user's personal email address (in this abbreviated example, "JSmith . . . "), the user's employment (in this abbreviated example, "Physician . . . "), the user's organizations (in this abbreviated example, "Civic Club . . . "), the user's interests (in this abbreviated example, "Fishing . . . "), the user's favorite musical artists (in this abbreviated example, "Mozart . . . "), the user's favorite books (in this abbreviated example, "Moby Dick . . . "), the user's political views (in this example, "Conservative"), and the user's religion (in this example, "Catholic"). In this example, creator module 104 may receive the user's selection of content instances 404 and then associate the same with the virtual persona 124(N).

In some examples, creator module 104 may assign different levels of data control to virtual personas 124(1)-(N). For example, the user may require social-networking application 208 to obtain his or her consent prior to performing certain networking actions in connection with virtual persona 124(1) but not require social-networking application 208 to obtain the user's consent to perform the same networking actions in connection with virtual persona 124(N). In this example, creator module 104 may define the levels of data control associated with virtual personas 124(1)-124(N) to reflect the user's differing requirements regarding his or her consent to perform such networking actions.

In some examples, creator module 104 may define one or more geo-locations associated with one or more of virtual personas 124(1)-(N) to facilitate geo-location reporting based on a geo-fencing paradigm. For example, the user may upload geo-location information that identifies the user's work buildings and/or offices to social-networking application 208. In this example, upon uploading the geo-location information to social-networking application 208, the user may submit a request to associate the work buildings and/or offices with virtual persona 124(1). In response to the user's request, creator module 104 may direct social-networking application 208 to associate the user's work buildings and/or offices with virtual persona 124(1).

By associating the user's work buildings and/or offices with virtual persona 124(1), social-networking application 208 may enable the user to share content that identifies the user's current location under virtual persona 124(1) while the user is located at the work buildings and/or offices. In addition, unless the user has also submitted a request to associate the work buildings and/or offices with virtual persona 124(N), social-networking application 208 may prevent the user from sharing content that identifies the user's current location under virtual persona 124(N) while the user is located at the work buildings and/or offices.

As illustrated in FIG. 3, at step 306 the various systems described herein may receive a request after creating the user's virtual personas to perform at least one networking action that implicates at least one of the user's virtual personas. For example, receiver module 106 may, as part of server 206 (or, alternatively, as part of computing device 202(1)), receive a request to perform a networking action after creating virtual personas 124(1)-(N) associated with social-networking identity 122. In this example, the requested networking action may implicate virtual persona 124(1) without implicating social-networking identity 122 as a whole or virtual persona 124(N).

Figure 5:
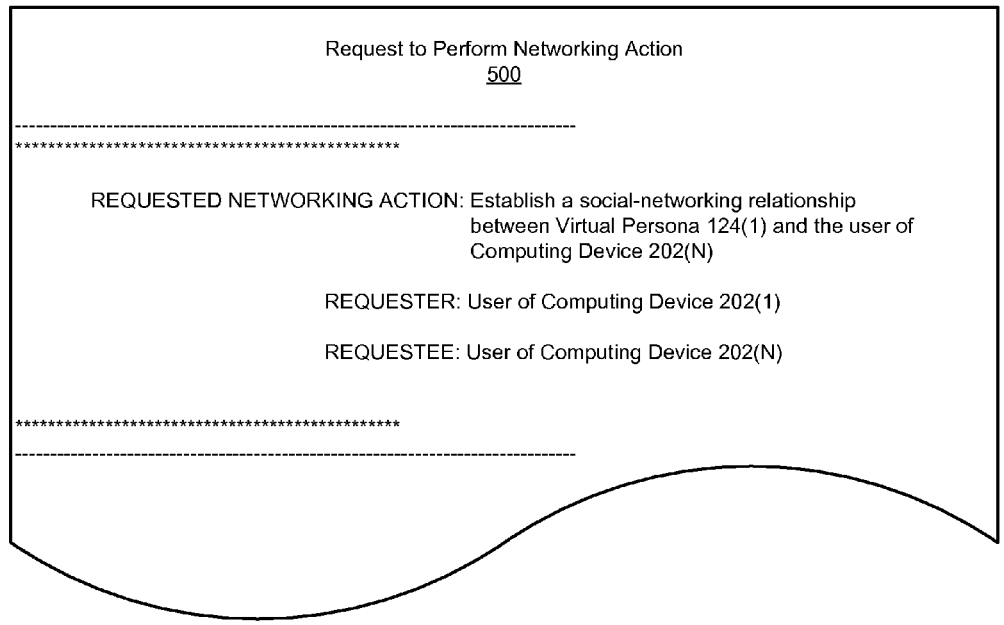
FIG. 5 is an illustration of an exemplary request to perform a networking action.

The systems described herein may perform step 306 in a variety of ways. In some examples, receiver module 106 may receive the request to perform the networking action from the user of computing device 202(1). For example, receiver module 106 may receive a request 500 in FIG. 5 from the user of computing device 202(1) to establish a social-networking relationship between virtual persona 124(1) and the user of computing device 202(N). As illustrated in FIG. 5, request 500 may identify the requested networking action (in this example, "Establish a social-networking relationship between Virtual Persona 124(1) and the user of Computing Device 202(N)"), the requester (in this example, "User of Computing Device 202(1)"), and the requestee (in this example, "User of Computing Device 202(N)").

In other examples, receiver module 106 may receive the request to perform the networking action from the user of computing device 202(N). For example, receiver module 106 may receive a request from the user of computing device 202(N) to establish a social-networking relationship between virtual persona 124(1) and the user of computing device 202(N).

In another example, receiver module 106 may receive a request from the user of computing device 202(N) to establish a social-networking relationship between social-networking identity 122 as a whole and the user of computing device 202(N). In this example, in response to receiving the request, receiver module 106 may transmit a request to obtain the consent of the user of computing device 202(1) to establish the social-networking relationship between social-networking identity 122 as a whole and the user of computing device 202(N). For example, receiver module 106 may direct computing device 202(1) to query the user regarding his or her consent to establish the social-networking relationship between social-networking identity 122 and the user of computing device 202(N). In this example, the user of computing device 202(1) may answer the query by denying his or her consent to establish the social-networking relationship between social-networking identity 122 and the user of computing device 202(N) but providing his or her consent to establish a social-networking relationship between virtual persona 124(1) and the user of computing device 202(N).

In some examples, receiver module 106 may analyze the request to perform the networking action to determine whether the requested networking action implicates one or more of virtual personas 124(1)-(N) or social-networking identity 122 as a whole. In one example, upon analyzing a request received from the user of computing device 202(1), receiver module 106 may determine that the user has selected virtual persona 124(1) to be associated with the networking action based at least in part on the analysis of the request. For example, upon analyzing a request from the user of computing device 202(1) to post content via social-networking application 208, receiver module 106 may determine that the user has selected virtual persona 124(1) (as opposed to, e.g., social-networking identity 122 or virtual persona 124(N)) to be associated with the content posted via social-networking application 208.

As illustrated in FIG. 3, at step 308 the various systems described herein may direct the social-networking application to perform the networking action such that the networking action implicates the user's virtual persona without implicating the user's entire social-networking identity. For example, director module 108 may, as part of server 206 (or, alternatively, as part of computing device 202(1)), direct social-networking application 208 to perform the networking action in response to the request. In this example, social-networking application 208 may perform the networking action such that the networking action implicates virtual persona 124(1) without implicating social-networking identity 122 as a whole or virtual persona 124(N).

The systems described herein may perform step 308 in a variety of ways. In one example, director module 108 may direct social-networking application 208 to establish a social-networking relationship between virtual persona 124(1) and the user of computing device 202(N). For example, prior to requesting a social-networking relationship with the user of computing device 202(N), the user of computing device 202(1) may assume virtual persona 124(1) by directing social-networking application 208 to perform all of the user's subsequent networking actions under virtual persona 124(1) rather than under social-networking identity 122 or virtual persona 124(N).

In this example, after assuming virtual persona 124(1), the user of computing device 202(1) may direct social-networking application 208 to submit a request to establish a social-networking relationship with the user of computing device 202(N). The phrase "social-networking relationship," as used herein, generally refers to any type or form of connection, link, or association between users of a social-networking application as provided or otherwise facilitated by the social-networking application.

In one example, social-networking application 208 may need to obtain the consent of the user of computing device 202(N) prior to establishing the requested social-networking relationship. In this example, upon obtaining the consent of the user of computing device 202(N), social-networking application 208 may establish the requested social-networking relationship. Since the user of computing device 202(1) had assumed virtual persona 124(1) prior to requesting the social-networking relationship with the user of computing device 202(N), director module 108 may ensure that the social-networking relationship is established only between virtual persona 124(1) and the user of computing device 202(N).

In one example, upon establishing the social-networking relationship between virtual persona 124(1) and the user of computing device 202(N), social-networking application 208 may provide the user of computing device 202(N) with access to all of content instances 402 associated with virtual persona 124(1). In contrast, even after establishing the social-networking relationship between virtual persona 124(1) and the user of computing device 202(N), social-networking application 208 may deny the user of computing device 202(N) access to any content instances associated with social-networking identity 122 but not associated with virtual persona 124(1) (e.g., the user's home address, the user's personal phone number, the user's personal email address, the user's political views, and/or the user's religion).

In one example, director module 108 may direct social-networking application 208 to transmit a message that includes a link to virtual persona 124(1) to the user of computing device 202(N). For example, as the user of computing device 202(1) is entering a business meeting, he or she may assume virtual persona 124(1) by directing social-networking application 208 to perform all of the user's subsequent networking actions under virtual persona 124(1) rather than under social-networking identity 122 or virtual persona 124(N). In this example, after striking up a conversation with the user of computing device 202(N) at the meeting, the user may submit a request to transmit his or her electronic business card to computing device 202(N) via social-networking application 208. Since the user had assumed virtual persona 124(1) prior to the transmission, director module 108 may ensure that the user's electronic business card transmitted via social-networking application 208 includes a link to virtual persona 124(1) instead of a link to social-networking identity 122 or virtual persona 124(N).

In one example, director module 108 may direct social-networking application 208 to transmit a message that includes at least one content instance associated with virtual persona 124(1) to the user of computing device 202(N). For example, after assuming virtual persona 124(1), the user of computing device 202(1) may submit a request to exchange contact information with the user of computing device 202(N) via social-networking application 208. In this example, since the user had assumed virtual persona 124(1) prior to the exchange, director module 108 may ensure that the contact information exchanged via social-networking application 208 includes the user's work phone number and/or work email address as opposed to the user's personal phone number and/or personal email address.

In one example, director module 108 may direct social-networking application 208 to share at least one content instance associated with virtual persona 124(1) with one or more other users of social-networking application 208. For example, after assuming virtual persona 124(1), the user of computing device 202(1) may submit a request to post a status update and/or photograph associated with the user via social-networking application 208. In this example, since the user had assumed virtual persona 124(1) prior to the posting, director module 108 may ensure that the status update and/or photograph posted via social-networking application 208 are visible only to other users of social-networking application 208 who have established a social-networking relationship with virtual persona 124(1).

In one example, director module 108 may direct social-networking application 208 to associate at least one content instance previously shared via social-networking application 208 with virtual persona 124(1). For example, after assuming virtual persona 124(1), the user of computing device 202(1) may submit a request to tag himself or herself in a photograph posted earlier by the user of computing device 202(N) via social-networking application 208. In this example, since the user had assumed virtual persona 124(1) prior to the tagging, director module 108 may ensure that the user's tag of himself or herself in the photograph is associated with virtual persona 124(1) as opposed to social-networking identity 122 or virtual persona 124(N).

In some examples, director module 108 may direct social-networking application 208 to perform the networking action in accordance with the level of data control assigned to virtual persona 124(1). For example, the user of computing device 202(N) may submit a request to tag the user associated with virtual persona 124(1) in a photograph posted via social-networking application 208. In this example, director module 108 may determine that the user associated with virtual persona 124(1) requires social-networking application 208 to obtain his or her consent prior to performing such a networking action. In response to this determination, director module 108 may direct social-networking application 208 to obtain the user's consent prior to tagging the user as virtual persona 124(1) in the photograph.

Figure 6:
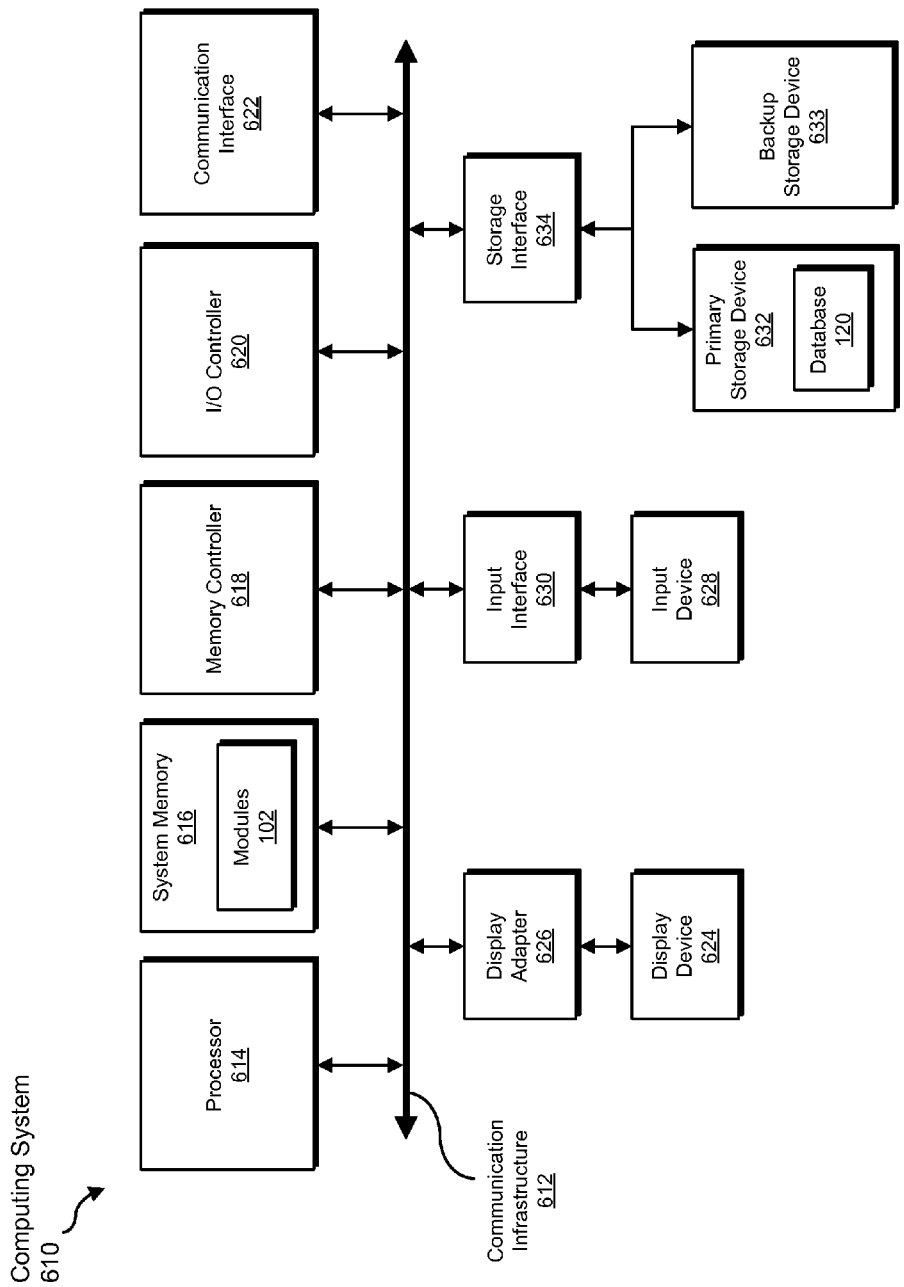
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the gerund phrases from claims steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630.

Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
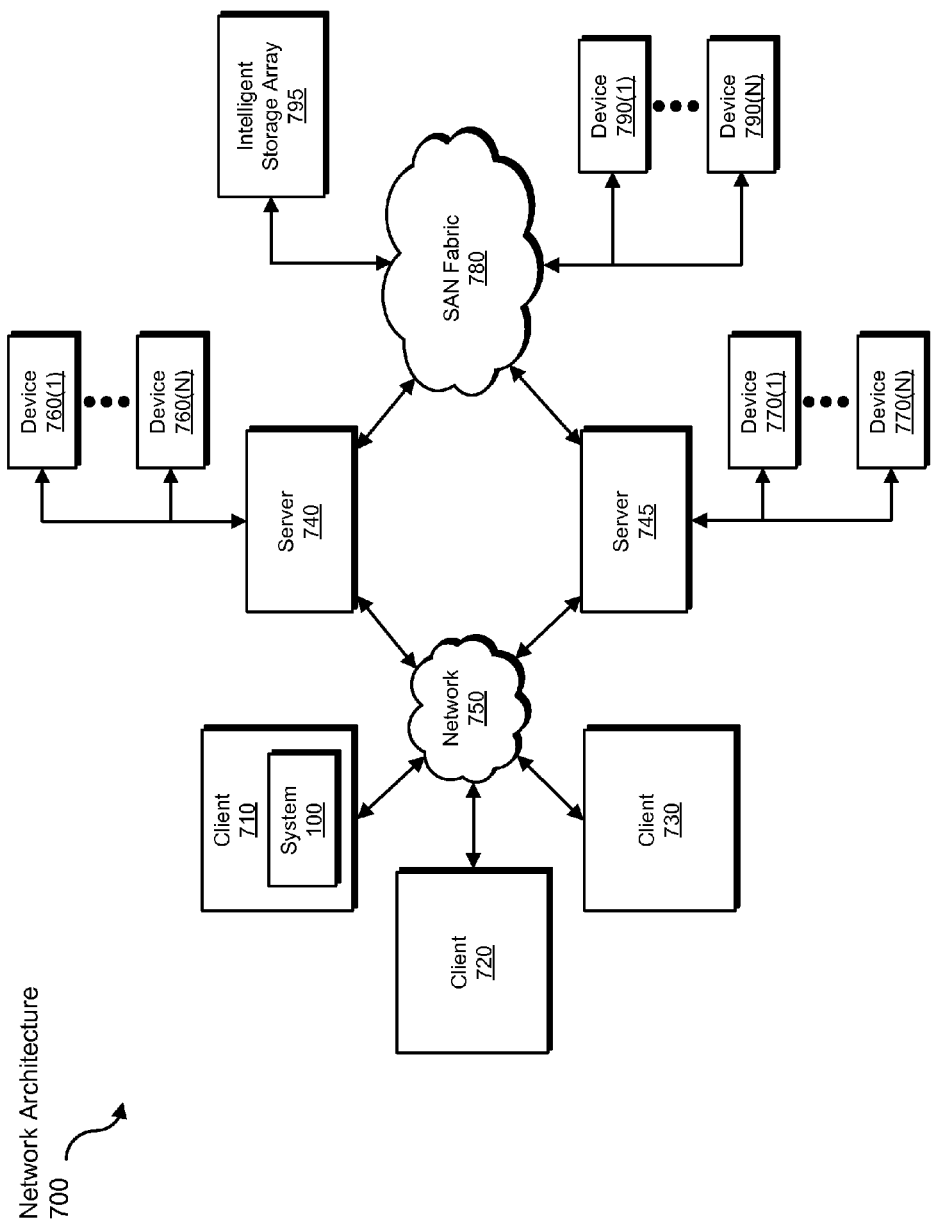
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the gerund phrases from claims steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a Wide Area Network (WAN), a Local Area Network (LAN), a Personal Area Network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for enabling users of social-networking applications to interact using virtual personas.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information from a user of a social-networking application (e.g., social-networking application 208), transform the user's information into a social-networking identity (e.g., social-networking identity 122) that includes a plurality of virtual personas (e.g., virtual personas 124(1)-(N)), enable the user to perform at least one networking action that implicate at least one of the user's virtual personas without implicating the user's entire social-networking identity, and store the virtual personas in a database located on one or more computing devices (e.g., computing devices 202(1)-(N) and/or server 206). Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enabling users of social-networking applications to interact using virtual personas, at least a portion of the method being performed by at least one physical computing device comprising at least one hardware processor, the method comprising:
   creating, by the physical computing device, a social-networking identity associated with a user of a social-networking application;
   creating, by the physical computing device and as part of the user's social-networking identity, a plurality of virtual personas that represent different real-life roles of the user, the plurality of virtual personas comprising:
      a first virtual persona of the user;
      a second virtual persona of the user;
   after creating the user's virtual personas, receiving a request at the physical computing device to establish a social-networking relationship between the first virtual persona and another user of the social-networking application;
   in response to receiving the request, directing the social-networking application by the physical computing device to establish the social-networking relationship between the first virtual persona and the other user without establishing a social-networking relationship between the second virtual persona and the other user;
   defining, by the physical computing device and based at least in part on input from the user of the social-networking application, a first geo-location associated with the first virtual persona and a second geo-location associated with the second virtual persona;
   upon defining the first and second geo-locations:
      enabling the user to share, under the first virtual persona, at least one content instance that identifies the user's location while the user is located at the first geo-location;
      preventing the user from sharing, under the second virtual persona, the content instance that identifies the user's location while the user is located at the first geo-location due at least in part to the first geo-location being associated with the first virtual persona and not being associated with the second virtual persona;
   associating at least one photograph previously shared via the social-networking application with the first virtual persona by:
      enabling the user to assume the first virtual persona within the social-networking application;
      after the user has assumed the first virtual persona:
         identifying a tag request submitted by the user to tag the user in the photograph previously shared via the social-networking application;
         ensuring that the user's tag in the photograph is associated with the first virtual persona and not associated with the second virtual persona due at least in part to the user having assumed the first virtual persona prior to submitting the tag request.

2. The method of claim 1, wherein the plurality of virtual personas comprise virtual personas that represent at least one of:
   the user's role as an employee;
   the user's role as a professional;
   the user's role as a colleague;
   the user's role as a relative;
   the user's role as a parent;
   the user's role as a child;
   the user's role as a friend;
   the user's role as an acquaintance;
   the user's role as a church member;
   the user's role as a student;
   the user's role as a job seeker;
   the user's role as a romantic-relationship seeker;
   the user's role as an online social-group moderator.

3. The method of claim 1, wherein creating the user's virtual personas comprises defining at least one of the user's virtual personas by:
   identifying a set of content instances associated with the user's social-networking identity;
   associating at least one of the content instances with the one of the user's virtual personas.

4. The method of claim 1, further comprising, upon establishing the social-networking relationship between the first virtual persona and the other user:
   providing the other user with access to at least one content instance associated with the first virtual persona;
   denying the other user access to at least one other content instance associated with the user's social-networking identity but not associated with the first virtual persona.

5. The method of claim 1, wherein receiving the request to establish the social-networking relationship comprises at least one of:
   receiving the request to establish the social-networking relationship from the user of the social-networking application;
   receiving the request to establish the social-networking relationship from the other user of the social-networking application.

6. The method of claim 5, wherein receiving the request to establish the social-networking relationship from the other user of the social-networking application comprises:
   in response to receiving the other user's request, transmitting a request to obtain the user's consent to establish the social-networking relationship;
   after transmitting the request to obtain the user's consent, obtaining the user's consent to establish the social-networking relationship between the first virtual persona and the other user without establishing a social-networking relationship between the user's entire social-networking identity and the other user.

7. The method of claim 5, wherein receiving the request to establish the social-networking relationship from the user of the social-networking application comprises:
   analyzing the user's request to establish the social-networking relationship;
   determining, based at least in part on the analysis of the user's request, that the user has selected the first virtual persona to be associated with the other user.

8. The method of claim 1, wherein directing the social-networking application to establish the social-networking application comprises:
   obtaining the other user's consent to establish the social-networking relationship;

in response to obtaining the other user's consent, directing the social-networking application to establish the social-networking relationship.

9. The method of claim 1, wherein directing the social-networking application to establish the social-networking application comprises establishing the social-networking relationship such that the social-networking relationship implicates the first virtual persona without implicating the second virtual persona.

10. The method of claim 1, wherein the creating, receiving, and directing steps are performed by a plug-in that interfaces with the social-networking application.

11. The method of claim 1, wherein directing the social-networking application to establish the social-networking application comprises transmitting, to at least one other user of the social-networking application, a message that includes a link to at least one content instance associated with the first virtual persona.

12. The method of claim 1, wherein directing the social-networking application to establish the social-networking application comprises transmitting a message that includes at least one content instance associated with the first virtual persona to the other user of the social-networking application.

13. The method of claim 1, wherein directing the social-networking application to establish the social-networking application comprises sharing, with the other user of the social-networking application, at least one content instance associated with the first virtual persona.

14. The method of claim 1, wherein directing the social-networking application to establish the social-networking application comprises associating at least one content instance previously shared via the social-networking application with the first virtual persona.

15. The method of claim 1, wherein:
the first virtual persona comprises a virtual persona that represents the user's role as a romantic-relationship seeker;
receiving a request to establish the social-networking relationship comprises receiving a request to establish a social-networking relationship between the user's virtual persona that represents the user's role as a romantic-relationship seeker and the other user of the social-networking application;
directing the social-networking application to establish the social-networking relationship comprises directing the social-networking application to establish the social-networking relationship between the user's virtual persona that represents the user's role as a romantic-relationship seeker and the other user without establishing a social-networking relationship between the user's virtual persona that represents the user's role as a business professional and the other user.

16. The method of claim 1, wherein:
the first virtual persona comprises a virtual persona that represents the user's role as a business professional;
receiving a request to establish the social-networking relationship comprises receiving a request to establish a social-networking relationship between the user's virtual persona that represents the user's role as a business professional and the other user of the social-networking application;
directing the social-networking application to establish the social-networking relationship comprises directing the social-networking application to establish the social-networking relationship between the user's virtual persona that represents the user's role as a business professional and the other user without establishing a social-networking relationship between the user's virtual persona that represents the user's role as a romantic-relationship seeker and the other user.

17. A system for enabling users of social-networking applications to interact using virtual personas, the system comprising:
a creator module, stored in memory, that:
creates a social-networking identity associated with a user of a social-networking application;
creates, as part of the user's social-networking identity, a plurality of virtual personas that represent different real-life roles of the user, the plurality of virtual personas comprising:
a first virtual persona of the user;
a second virtual persona of the user;
a receiver module, stored in memory, that receives, after creating the user's virtual personas, a request to establish a social-networking relationship between the first virtual persona and another user of the social-networking application;
a director module, stored in memory, that directs, in response to the request, the social-networking application to establish the social-networking relationship between the first virtual persona and the other user without establishing a social-networking relationship between the second virtual persona and the other user;
wherein the creator module defines, based at least in part on input from the user of the social-networking application, a first geo-location associated with the first virtual persona and a second geo-location associated with the second virtual persona such that the social-networking application:
enables the user to share, under the first virtual persona, at least one content instance that identifies the user's location while the user is located at the first geo-location;
prevents the user from sharing, under the second virtual persona, the content instance that identifies the user's location while the user is located at the first geo-location due at least in part to the first geo-location being associated with the first virtual persona and not being associated with the second virtual persona;
wherein the director module:
directs the social-networking application to associate at least one photograph previously shared via the social-networking application with the first virtual persona by:
enabling the user to assume the first virtual persona within the social-networking application;
after the user has assumed the first virtual persona:
identifying a tag request submitted by the user to tag the user in the photograph previously shared via the social-networking application;
ensuring that the user's tag in the photograph is associated with the first virtual persona and not associated with the second virtual persona due at least in part to the user having assumed the first virtual persona prior to submitting the tag request;
at least one hardware processor that executes the creator module, the receiver module, and the director module.

18. The system of claim 17, wherein the creator module:
identifies a set of content instances associated with the user's social-networking identity;
associates at least one of the content instances with the first virtual persona.

19. A non-transitory computer-readable-storage medium comprising one or more computer-executable instructions that, when executed by at least one hardware processor of at least one physical computing device, cause the physical computing device to:
- create a social-networking identity associated with a user of a social-networking application;
- create, as part of the user's social-networking identity, a plurality of virtual personas that represent different real-life roles of the user, the plurality of virtual personas comprising:
  - a first virtual persona of the user;
  - a second virtual persona of the user;
- receive, after creating the user's virtual personas, a request to establish a social-networking relationship between the first virtual persona and another user of the social-networking application;
- direct, in response to receiving the request, the social-networking application to establish the social-networking relationship between the first virtual persona and the other user without establishing a social-networking relationship between the second virtual persona and the other user;
- define, based at least in part on input from the user of the social-networking application, a first geo-location associated with the first virtual persona and a second geo-location associated with the second virtual persona;
- upon defining the first and second geo-locations:
  - enables the user to share, under the first virtual persona, at least one content instance that identifies the user's location while the user is located at the first geo-location;
  - prevents the user from sharing, under the second virtual persona, the content instance that identifies the user's location while the user is located at the first geo-location due at least in part to the first geo-location being associated with the first virtual persona and not being associated with the second virtual persona;
- directs the social-networking application to associate at least one photograph previously shared via the social-networking application with the first virtual persona by:
  - enabling the user to assume the first virtual persona within the social-networking application;
  - after the user has assumed the first virtual persona:
    - identifying a tag request submitted by the user to tag the user in the photograph previously shared via the social-networking application;
    - ensuring that the user's tag in the photograph is associated with the first virtual persona and not associated with the second virtual persona due at least in part to the user having assumed the first virtual persona prior to submitting the tag request.

* * * * *